Sept. 12, 1961　　　HIDEO MIYAUCHI　　　2,999,443
OPTICAL FILTER COMPENSATION MEANS COUPLED
TO EXPOSURE-RESPONSIVE DEVICE
Filed Dec. 1, 1959　　　　　　　　　　　2 Sheets-Sheet 1
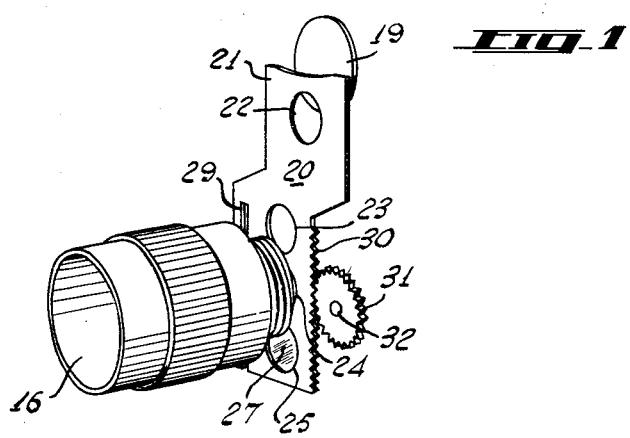
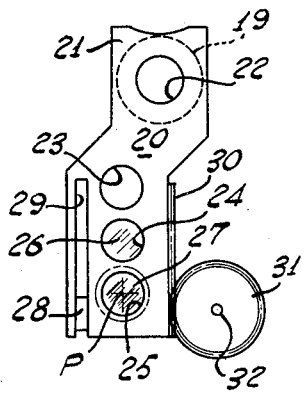
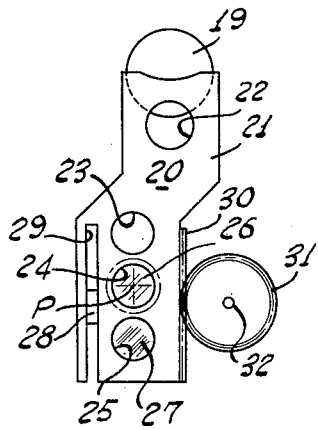
INVENTOR
HIDEO MIYAUCHI
By Stanley Wolder
ATTORNEY Sept. 12, 1961 HIDEO MIYAUCHI 2,999,443
OPTICAL FILTER COMPENSATION MEANS COUPLED
TO EXPOSURE-RESPONSIVE DEVICE
Filed Dec. 1, 1959 2 Sheets-Sheet 2
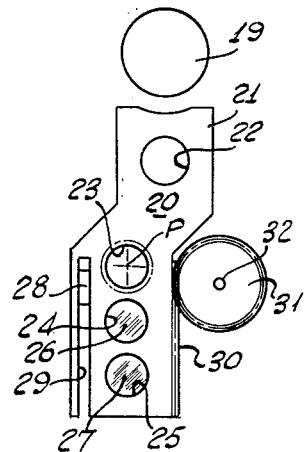
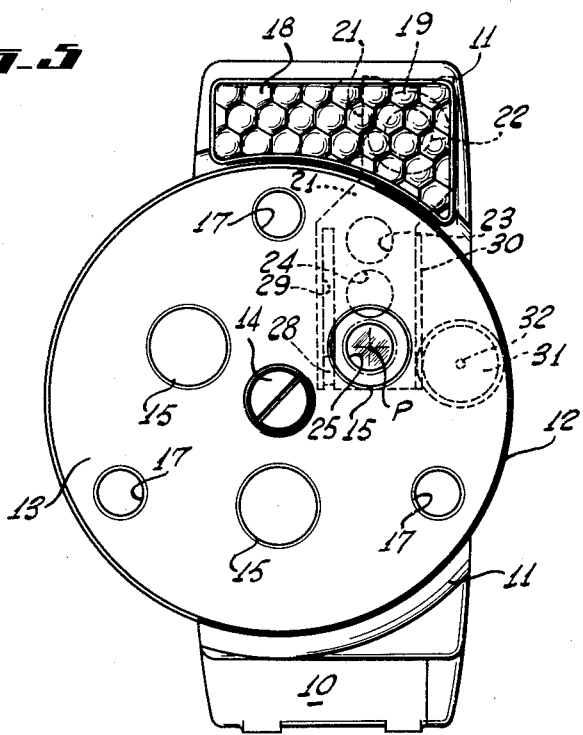
INVENTOR
HIDEO MIYAUCHI
BY Stanley Wilder
ATTORNEY

United States Patent Office
2,999,443
Patented Sept. 12, 1961

2,999,443
OPTICAL FILTER COMPENSATION MEANS COUPLED TO EXPOSURE-RESPONSIVE DEVICE
Hideo Miyauchi, Okaya-shi, Nagano-ken, Japan, assignor to Yashica Co., Ltd., Tokyo, Japan, a corporation of Japan
Filed Dec. 1, 1959, Ser. No. 856,469
Claims priority, application Japan Dec. 28, 1958
10 Claims. (Cl. 95—10)

The present invention relates to means to adjust the amount of light striking an exposure-responsive means as a filter positioning means is operated.

Presently, both still and motion picture cameras often have associated with them light-responsive means which are viewed to obtain light readings or matched by means of coinciding pointers or the like or which light responsive means are directly connected to a shutter either to provide a detent to enable setting of the aperture or themselves translate sufficient light energy into mechanical energy to employ such energy to directly vary the aperture. Such devices usually employ a photovoltaic cell to convert light energy into electrical energy and then use such light energy to produce mechanical movement in the needle or other operative means connected to the armature of a d'Arsonval movement or other electrical motor. When filters are employed in series with lenses of cameras so equipped it has been necessary to compute corrections in the apertures and manually set them in.

A primary object of the present invention is to provide means to couple filter positioning means to a light-responsive device to automatically set into the optical system with which such filter and device is employed a correction for the filter.

A further object thereof is to provide such means which are simple and inexpensive to construct and yet dependable and accurate.

A still further object thereof is the provision of such means adaptable to function where a plurality of such filters is employed.

The above and other objects are attained by the present invention which in the preferred form, here shown in a motion picture camera and hereinafter more fully described, consists of a plate slidably mounted to a camera body having a plurality of apertures formed therein in which there are set one or more optical filters sequentially presentable to register with the optical axis of the lens assembly of said camera, the top part of said plate comprising a masking member which blocks some of the light otherwise incident upon the photovoltaic cell which provides the measuring electrical current for the exposure meter or other electro-mechanical translation device employed in the camera to set or aid in setting the aperture. The masking member is so proportioned and positionable that when the filter placed in registry with the optical axis cuts down a predetermined proportion of the light which otherwise would travel through the lens and strike the film, then a sufficient proportion of the photovoltaic cell is obscured by the masking member to provide an appropriate correction to the measuring electrical current so that the translation device will be adequately corrected. Thus if a given filter cuts down the light travelling through a lens to 50% of what it otherwise would be, then the masking member will be moved to cut off as much light as is necessary to move the needle of an exposure meter to indicate the need for an aperture one stop higher (in the case of a viewed exposure meter).

Other objects and a fuller understanding of the present invention may be had by referring to the following description and claims, taken in conjunction with the accompanying drawing which illustrates a preferred embodiment thereof, it being intended that the foregoing statement of the objects of the present invention and the brief summary thereof are intended to generally explain the same without limiting it in any manner.

FIG. 1 is a prospective view of an embodiment of the present invention shown in conjunction with a lens or objective in the same position as illustrated in FIG. 3.

FIG. 2 is an elevational front view thereof, the optical axis of the objective being shown as a cross and the bottom filter being shown in registry with such axis.

FIG. 3 is an elevational front view thereof similar to the view of FIG. 2 but showing the upper filter in registry with said optical axis.

FIG. 4 is still another like view showing the upper aperture (mounting no filter) in registry with the optical axis of the objective.

FIG. 5 is a front elevational view of a motion picture camera incorporating the present invention shown in the position of FIG. 2.

Referring now to the drawing which illustrates a preferred embodiment of the present invention, the same includes a motion picture camera body 10 (see FIG. 5) to the front wall 11 of which there is fixedly secured a turret base 12 (over a wide central aperture) to which in turn there is rotatably secured a turret head 13 by means of pivot screw 14, which head is apertured to provide lens-mounting apertures 15 in which there may be mounted lens assemblies or objectives such as lens 16 (see FIG. 1) which lenses each have an optical axis, the extension of which when in the operative position registering with an aperture in turret base 12 is referred to as the optical axis "P" of the camera (indicated by crossed lines), the two axes being identical in such case, of course. Smaller finder-mounting apertures 17 are likewise formed in said head 13.

The upper end of front wall 11 is apertured to provide a window closed by compound prism or lens 18 behind which there is positioned a photovoltaic cell 19 which upon exposure to light generates a measuring current conveyed by means not shown to a likewise unillustrated light meter or other means with which it acts as a photo transducer to provide a photo-mechanical translation means the final output of which may be a meter needle which may be read against a marked dial to give aperture exposure readings or a movable detent which enables the ready movement of a shutter aperture device to an appropriate setting by movement to a position contacting such detent or means to directly transpose aperture leaves or other aperture defining means.

A filter plate 20, divided into an upper masking section 21, having a light-control aperture 22 formed therein, and a lower filter mounting section in which three apertures 23, 24, and 25 are formed, filters 26 and 27 being mounted within and filling apertures 24 and 25 respectively, is vertically slideably mounted to the inside of turret base 12 by means of the engagement of a lug 28 extending inwardly from said base with a slot 29 extending vertically inward from the lower end of said plate. A side of plate 20 is toothed to form a rack 30, which is operatively engaged by a pinion 31 rotatably secured to the inside of turret base 12 by means of pivot pin 32, said pinion extending from a lateral slot (not shown) in the front side of camera body 10 so as to be manually rotatable by a user.

The upper end of masking section 21 is recessed to provide a desired amount of masking action when the plate is in its median position as shown in FIG. 3.

In operation, if no filter action is desired, plate 30 is positioned as shown in FIG. 4; light passing through compound prism 18 passes over the upper edge of the masking section 21 and reaches cell 19 undiminished and the light traveling along the camera optical axis passes unimpeded through aperture 23 which contains no filter. If medium filter action is wanted, the user rotates pinion 31 which by engagement of rack 30 causes plate 20 to be displaced upwards until it reaches the position shown in FIG. 3. A conventional click stop (not shown) may be incorporated to advise the user when such position is reached. In this median position the upper portion of masking section 21 obscures a part of cell 19, causing it to reduce its electrical measuring current output, the amount of reduction being a function of the amount of light intercepted by filter 26, thereby causing the photo-mechanical system to compensate for such intercepted light and increase the aperture reading in the case of a light meter or enable or effect a fixing of a wider aperture in the other types of translators mentioned.

If still greater filter action is sought, the user may further rotate pinion 31 to place plate 20 in the position illustrated in FIG. 2. Here filter 27, which transmits less light than filter 26, registers with optical axis "P," and masking section 21 lies between all of cell 19 and the source of light reaching cell 19 in this position being determined by the dimensions of light control aperture 22.

While a specific embodiment has been described, it is obvious that many changes may be made without departure therefrom. Thus instead of permitting pinion 31 to protrude from body 10, it may be converted to an idler and another rotatable or lever-like member connected to it may be permitted to extend from said body. So too plate 20 need not slide vertically but may be movable in any direction. Again, the configuration of masking section 21 may be varied to permit it to alter the measuring current flowing from cell 19 in any predetermined fashion. Only one filter may be used, or more than two may be employed. The filters may be color filters or gray wedges or other light reducing means. While the device employing the present invention has been described as a motion picture camera, the invention may be employed with other cameras and optical devices.

Although the present invention has been described with a certain degree of particularity, it is understood that the present disclosure has been made only by way of example and that numerous additional changes in the details of construction, combination and arrangement of parts may be resorted to without transcending the scope of the invention as hereinafter claimed.

What is claimed is:

1. Filter compensation means for use with an optical device including a body, a lens having an optical axis and a photo-mechanical translator including a photo transducer, comprising a plate having a plurality of apertures formed therein, movably mounted to said body to follow a path which sequentially brings said apertures into registration with the optical axis of said lens, an optical filter mounted in at least one of said apertures in said plate, and masking means consisting of a substantially opaque member connected to and movable with said plate and so shaped and positioned as to intercept a predetermined fraction of the light directed at said transducer when said filter registers with said optical axis and permit the remaining fraction of said light to pass substantially undiminished.

2. Filter compensation means as described in claim 1, a rack fixedly connected to said plate and a pinion operatively connected to said body and engaging said rack, said pinion being manually operable from without said body.

3. Filter compensation means as described in claim 1, said masking means comprising a section integral with said plate.

4. Filter compensation means as described in claim 1, said masking means having formed therein a control aperture, said control aperture registering with said photo transducer when said filter registers with said optical axis.

5. Filter compensation means for use with a photographic camera including a body, a lens having an optical axis and a photo-mechanical translator including a photo transducer, comprising a plate having a plurality of apertures formed therein, movably mounted to said body to follow a path which sequentially brings said apertures into registration with the optical axis of said lens, an optical filter mounted in at least one of said apertures, said plate having an end portion defining a masking portion consisting of an opaque member so shaped and disposed as to intercept a predetermined fraction of the light directed at said transducer when said filter registers with said optical axis and to permit the remaining fraction of said light to pass substantially undiminished.

6. Filter compensation means as described in claim 5, a rack fixedly connected to said plate and a pinion connected to said body and operatively engaging said rack, said pinion being manually operable from without said body.

7. Filter compensation means for use with a photographic camera including a body, a lens having an optical axis and a photo-mechanical translator including a photovoltaic cell, comprising a plate having a plurality of apertures formed therein and movably mounted to said body to follow a path which sequentially presents said apertures in registration with the optical axis of said lens, an optical filter mounted in at least two of said apertures, said plate having a masking portion consisting of an opaque section so shaped and disposed as to intercept a predetermined fraction of the light directed upon said cell when at least one of said filters registers with said optical axis and to permit the remaining fraction of said light to pass substantially undiminished.

8. Filter compensation means as described in in claim 7, said plate having a series of notches formed along one side thereof parallel to said path to provide a rack and a pinion rotatably connected to said body in operative engagement with said rack.

9. Filter compensation means as described in claim 8, said body having a slot formed therein, said pinion having a portion extending through said slot, whereby said pinion is manually operable from without said body.

10. Filter compenation means as described in claim 5, said masking portion having formed therein a control aperture, said aperture registering with said cell when one of said filters registers with said optical axis.

References Cited in the file of this patent
UNITED STATES PATENTS

| | | |
|---|---|---|
| 2,058,562 | Bucky | Oct. 27, 1936 |
| 2,242,013 | Martin | May 13, 1941 |
| 2,343,206 | Rath | Feb. 29, 1944 |